United States Patent [19]

Rea et al.

[11] 4,008,693
[45] Feb. 22, 1977

[54] ROTARY ENGINE

[76] Inventors: Everett Dale Rea; Terry Gene Rea, both of 1928 Cardinal Drive, Sioux Falls, S. Dak. 57105

[22] Filed: Aug. 26, 1975

[21] Appl. No.: 607,996

[52] U.S. Cl. .............................................. 123/8.25
[51] Int. Cl.² ........................................ F02B 53/00
[58] Field of Search ............... 123/8.19, 8.25, 8.29, 123/8.35, 8.43

[56] References Cited
UNITED STATES PATENTS

| 593,514 | 11/1897 | Chaudun | 123/8.25 |
| 3,060,910 | 10/1962 | McCall | 123/8.25 |
| 3,060,911 | 10/1962 | Milton | 123/8.25 |
| 3,797,237 | 3/1974 | Kamiya | 123/8.25 X |
| 3,863,609 | 2/1975 | Ikarashi | 123/8.25 X |

FOREIGN PATENTS OR APPLICATIONS

| 512,389 | 4/1955 | Canada | 123/8.25 |

*Primary Examiner*—Carlton R. Croyle
*Assistant Examiner*—Michael Koczo, Jr.
*Attorney, Agent, or Firm*—Larson, Taylor and Hinds

[57] ABSTRACT

A rotary combustion engine having intermeshing rotors, and provided with external transfer passageways which connect the rotor chambers and function as combustion chambers for air compressed by the intermeshing of the rotors. The engine may also be provided with peripheral holding areas communicating with the rotor chambers and with air intake passageways through each lobe of the rotors, which are configured to provide a supercharging effect when the rotors are rotated. The engine may further be provided with notches in the periphery of each rotor hub for admitting air compressed by the intermeshing of the rotors into the transfer passageways in timed relationship to the rotation of the rotors.

7 Claims, 16 Drawing Figures

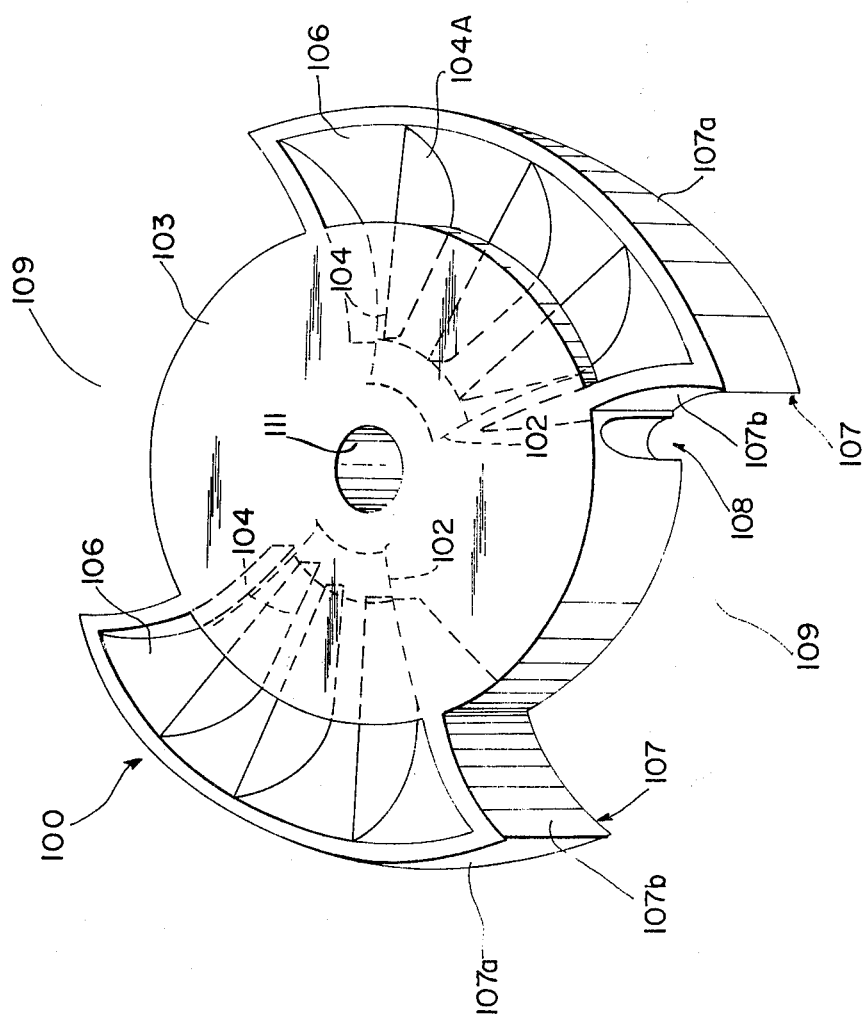

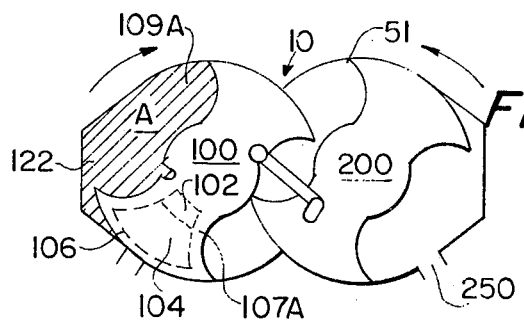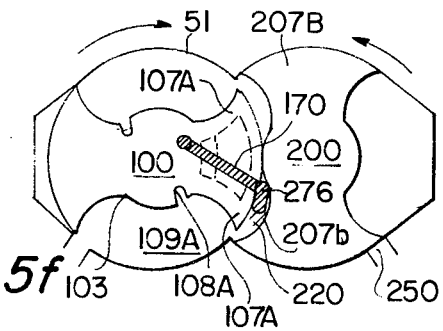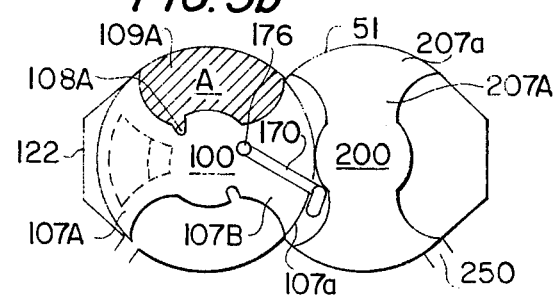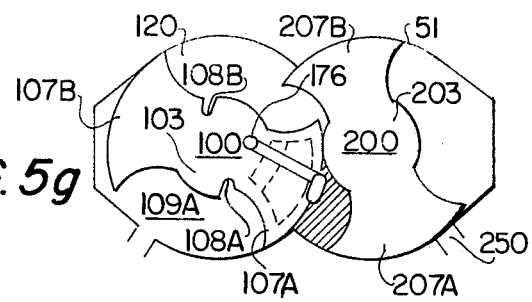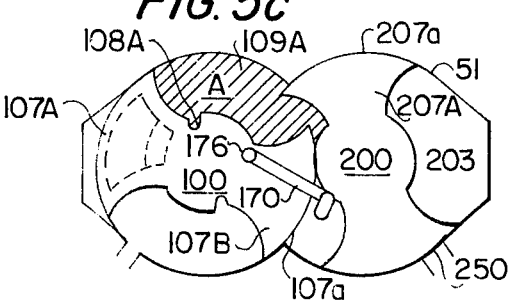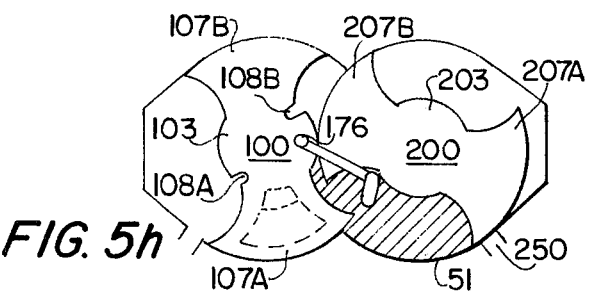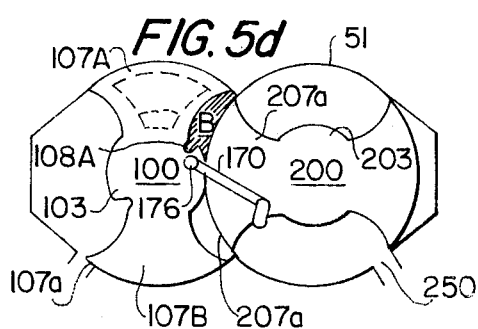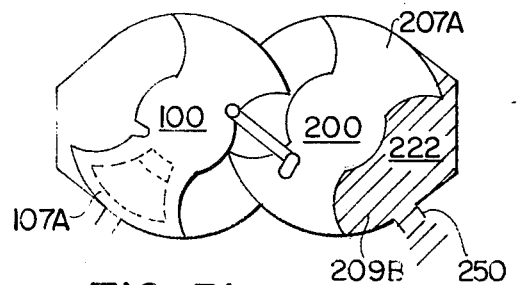

ROTARY ENGINE

FIELD OF THE INVENTION

This invention relates to rotary combustion engines and more particularly to supercharging rotary combustion engines having an external combustion chamber.

BACKGROUND OF THE INVENTION

Rotary engines having two intermeshing rotors, each having a plurality of lobes defining a plurality of voids there-between are known in the art. Such an engine is shown in the French patent to Costa, No. 544,127. An alternate configuration of rotors is shown in U.S. Pat. No. 3,435,808 to Allender. In both of these patents, air is compressed in a chamber formed by a lobe from one rotor and a void from the other rotor and is combusted either in the same chamber or a second chamber formed by the same rotor lobe and void. Configurations of this type suffer from a number of drawbacks. Of primary concern is the loss of power which inheres in the fact that the same rotor and void form the compression chamber and the power chamber. As a result, the power chamber is already expanding while compression is still taking place, thus shortening the effective power stroke significantly. In addition, since combustion takes place in a chamber formed by the rotor surfaces themselves, rotary engines of this type are subject to severe wear on the rotor surfaces. A further shortcoming of prior art rotary engines of this type is that they require many moving parts, and in particular, additional valves and timing gears therefor.

SUMMARY OF THE INVENTION

These and other disadvantages of the prior art are overcome by the rotary combustion engine of the present invention, which comprises an engine block having therein at least first and second adjoining rotor chambers. First and second rotors having at least two spaced lobes defining voids there-between are disposed in the respective rotor chambers, which are configured such that the rotor lobes intermesh with the rotor voids during rotation of the rotors. First and second transfer passageways which function as combustion chambers are provided, the first transfer passageway connecting the first rotor chamber with the second rotor chamber such that air compressed by the intermeshing of the voids of the first rotor and the lobes of the second rotor may be mixed with fuel and ignited therein to provide a thrust for rotating the second rotor. Similarly, the second transfer passageway connects the second rotor chamber with the first rotor chamber such that air compressed by the intermeshing of the voids of the second rotor and the lobes of the first rotor may be mixed with fuel and ignited therein to provide a thrust for rotating said first rotor.

An additional aspect of the invention includes first and second peripheral holding chambers communicating with the first and second rotor chambers, respectively, and an air intake passageway through each lobe of the rotors. The air intake passageways of the first rotor communicate with the first holding chamber when at least a portion of an air intake passageway is in relative alignment with at least a portion of the first holding chamber. Similarly, the air intake passageways of the second rotor communicate with the second rotor chamber when at least a portion of an air intake passageway is in relative alignment with at least a portion of the second holding chamber. The air intake passageways are configured to provide a supercharging effect when the rotors are rotated, and may be provided with at least one vane extending radially with respect to the axis of rotation of the rotors to increase the supercharging effect.

A still further aspect of the invention includes means for admitting air compressed by the intermeshing of the rotor voids and lobes into the transfer passageways in timed relationship to the rotation of the rotors. In a preferred embodiment, the rotors comprise central hubs from which the lobes extend radially outward, and the means for admitting air into the transfer passageways comprises at least first and second notches located in the periphery of the rotor hub to provide communication between a void and the corresponding transfer passageway when the transfer passageway and notch are in relative alignment.

Thus, a rotary engine is provided wherein combustion takes place in a chamber of optimum configuration, a power stroke of maximum length is afforded, and a minimum of moving parts, with no additional moving valves or timing gears therefor, is required.

Other features and advantages of the invention will be set forth in, or apparent from, the detailed description of a preferred embodiment found hereinbelow.

BRIEF DESCRIPTION OF THE DRAWINGS

FIG. 4 is a perspective view of a rotor constructed according to the invention, the rotor being oriented in inverse position from that shown in FIGS. 1–3;

FIGS. 5a through 5i are schematic diagrams showing the successive phases of a complete cycle of the engine shown in FIG. 1 for one transfer passageway;

DETAILED DESCRIPTION OF A PREFERRED EMBODIMENT

Figure 1:
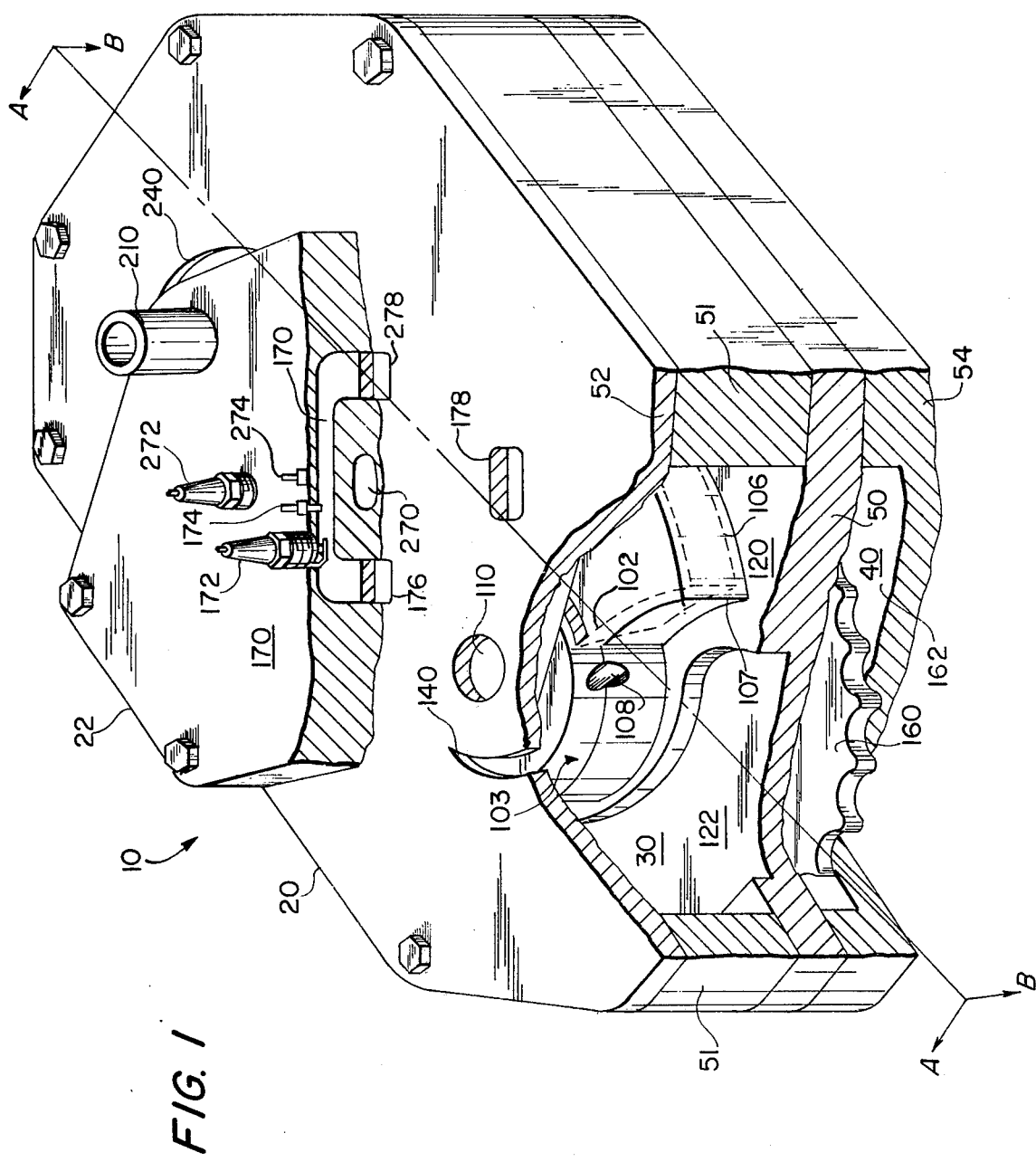
FIG. 1 is a perspective view with partial cutaway of a rotary engine constructed according to the invention.
Figure 2:
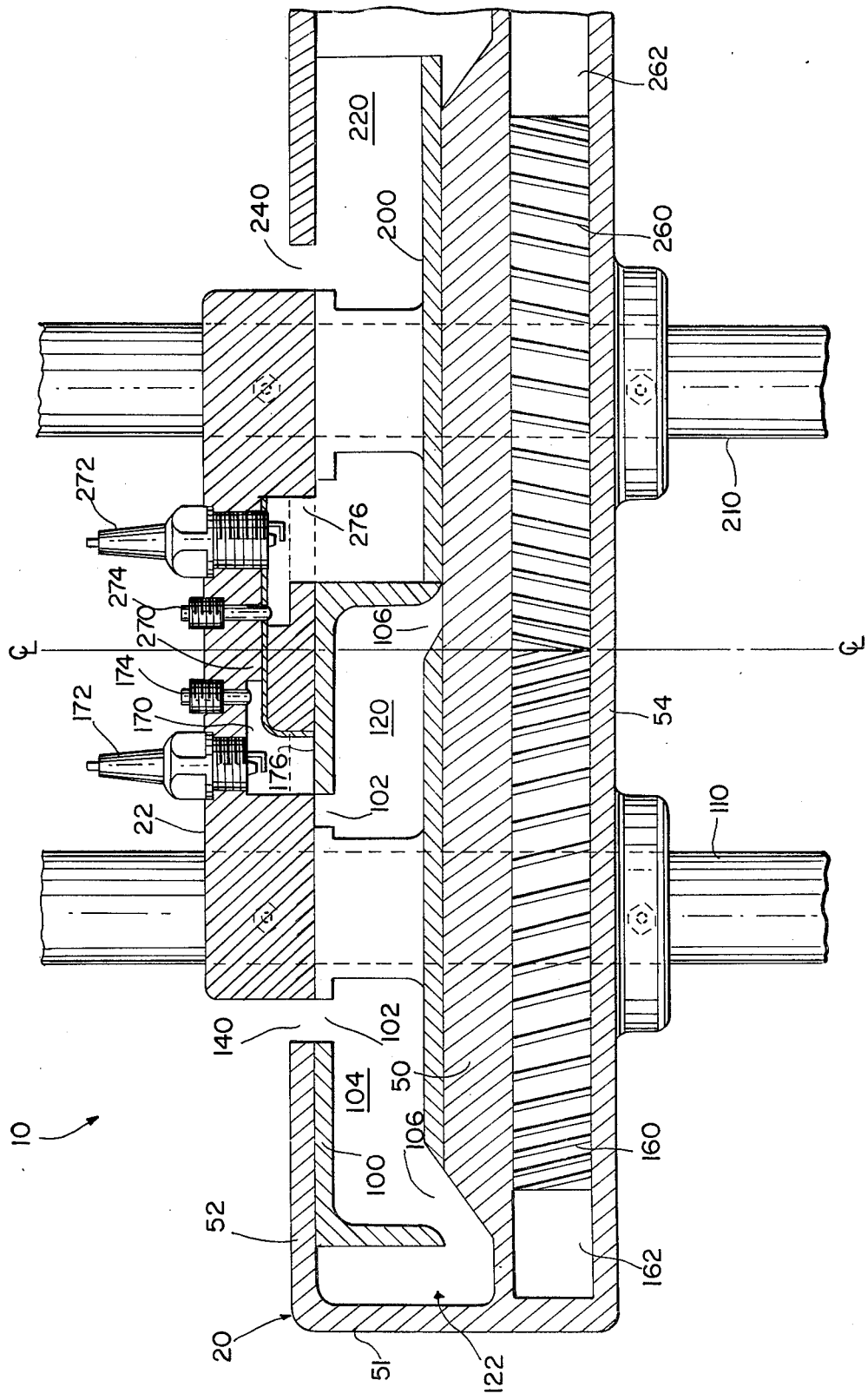
FIG. 2 is a side elevational view taken in cross section along line A—A of FIG. 1 of the engine shown in FIG. 1, with certain details omitted for the sake of clarity.
Figure 3:
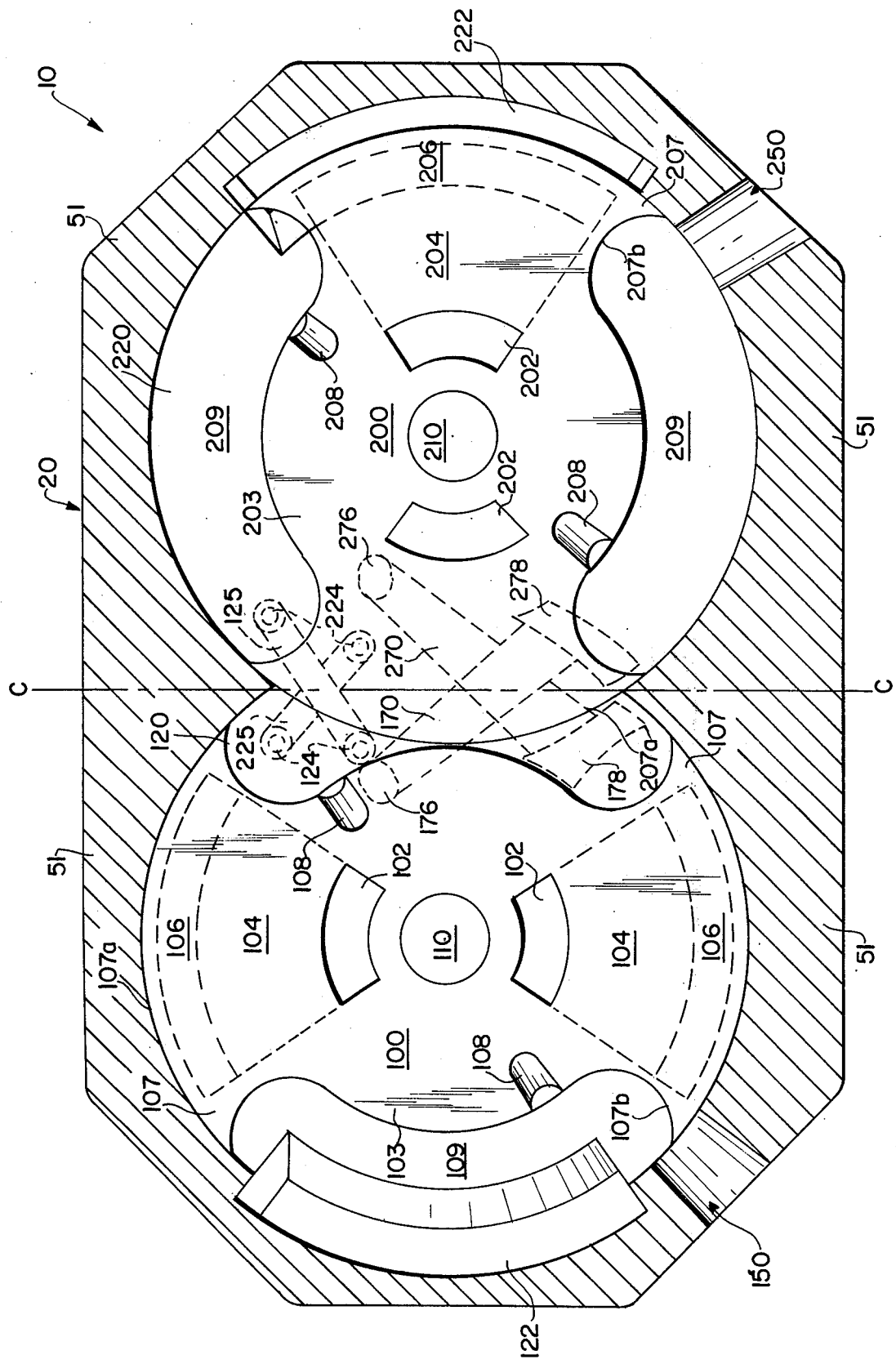
FIG. 3 is a plan view taken in cross section along line B—B of FIG. 1 of the engine shown in FIG. 1, with certain details omitted for the sake of clarity.

Referring to FIGS. 1–3, a rotary engine constructed according to the invention is generally denoted 10 and comprises an engine block 20 and an exchange head manifold 22 mounted thereon.

Engine 10 is substantially bilaterally symmetrical about the transverse mid-plane C—C. For the sake of clarity, the bilateral elements to the left of the mid-plane C—C have been designated with numbers in the one hundreds, and the corresponding bilateral elements to the right of mid-plane C—C have been designated with similar numbers in the two hundreds. Further, in general only the elements to the left of mid-plane C—C will be described, and the relationship of elements vertically with respect to one another will be described with reference to the orientation of engine 10 shown in FIGS. 1—3. It will be appreciated that in practice the orientation of engine 10 is not restricted to the orientation shown.

Engine block 20 contains two chambers, a rotor chamber 30 and a timing gear chamber 40. Rotor chamber 30 is disposed above timing gear chamber 40 and is separated therefrom by an intermediate wall 50 of engine block 20.

Rotor chamber 30 comprises a pair of adjacent main chambers 120 and 220 for receiving rotors 100 and 200, respectively, and a pair of peripheral air holding chambers 122 and 222 located at each end of chamber 30. As shown, exhaust passageways 150 and 250 communicating with rotor chambers 120 and 220, respectively, are provided through the wall 51 of engine block 20 to permit combusted gases to escape the rotor chambers. Exhaust passageways, 150 and 250 may advantageously be dimensioned to maximize the flow of exhaust gases therethrough.

Timing gear chamber 40 comprises a pair of chambers 162 and 262 for receiving timing gears 160 and 260, respectively. Timing gear 160 and rotor 100 are disposed in coaxial alignment within their respective chambers and are fixedly mounted on a common axial shaft 110 which extends through openings in the intermediate wall 50, upper wall 52, and lower wall 54 of engine block 20. Shaft 110 is mounted for rotation in engine block 20 but axial displacement thereof is prevented by the coaction of rotor 100 and timing gear 160 with the walls of engine block 20.

Timing gears 160 and 260 intermesh and assure proper relative rotation of rotors 100 and 200. Further gearing and shafts, not shown, may be provided for other timing functions connected with fuel injection and ignition, and for power transmission.

Rotors 100 and 200 may be comprised of a plurality of spaced lobes which define a plurality of gaps or voids there-between. Referring additionally to FIG. 4, a perferred embodiment of rotor 100 is illustrated and comprises two generally crescent-shaped lobe portions or lobes 107 extending radially outwardly from an arcuate central hub portion or hub 103 in substantially opposed relationship to one another, and a pair of corresponding voids 109 defined therebetween. The outer surface 107a of lobe 107 may be of differing lengths, but not greater than the 90L of arc encompassed between the lobe tips, as illustrated. Also, the degree of curvature of inner surfaces 107b may vary, depending on the length of lobe surface 107a, the number of lobes, and the depth of the voids.

Each lobe 107 has an air passageway 104 therethrough connecting an air intake aperture 102 located in the upper surface of hub 103 and an air outlet aperture 106 located in the lower surface of lobe 107 relatively near the periphery thereof. Apertures 102 and 106 may advantageously be elongated, curved slots concentrically disposed with respect to the rotational axis of rotor 100, as shown, and preferably dimensioned such that the flow of air through air passageway 104 during operation of engine 10 into holding chamber 122 is maximized. In one embodiment, not illustrated, intake apertures 102 may comprise a single aperture of substantially 360L curvature. Air flow through air passageway 104 may also be increased by providing one or more radially extending vanes 104A (see FIG. 4) within passageway 104.

Rotor 100 also comprises two relatively opposed notches 108 located on the periphery of hub 103 in the regions of voids 109 and relatively adjacent the bases of lobes 107, as illustrated. Also as illustrated, notches 108 extend into the upper surface of hub 103, but do not extend into the lower surface thereof. Notches 108 function as air passageways in a manner to be described in more detail hereinbelow.

Main rotor chambers 120 and 220 are configured such that when rotors 100 and 200 are disposed within their respective rotor chambers and rotating, the lobes 107 of each rotor intermesh with the voids 109 of the other rotor in the central region of rotor chamber 30.

As illustrated, rotors 100 and 200 are so dimensioned and arranged that a portion of the outer edge 107a of lobe 107 is substantially contiguous with a portion of the peripheral edge of hug 203 or rotor 200 and/or wall 51 of engine block 20 throughout the period during which a lobe 107 is intermeshing with a void 109, as will be described in more detail hereinbelow.

Rotors 100 and 200 are also dimensioned with respect to chambers 120 and 220 such that a close fit is provided between the outer surface 107a of lobe 107 and the side walls 51 of engine block 20 defining rotor chambers 100 and 200 in order to minimize the leakage of gas between the rotor lobes 107 and the engine block walls 51. In an alternative embodiment, rotor lobes 107 may also be provided with conventional seals or the like to further minimize such gas leakage. Similarly, a close fit is provided between the upper surfaces of rotors 100 and 200 and the upper wall 52 of engine block 20 and between the lower surface of rotors 100 and 200 and intermediate wall 50 of engine block 20, so as to minimize the leakage of gas between these surfaces.

The upper wall of engine block 20 has located therein air inlet orifices 140 and 240. Inlet orifice 140 is positioned so as to permit air to enter rotor air intake orifices 102 when, during rotation of rotor 100, as will be described in more detail hereinbelow, orifices 102 are in relative alignment with orifice 140.

Exchange head manifold 22 is mounted on the upper surface of engine block 20 and comprises two transfer passageways 170 and 270 which cross with one passageway passing above the other, as illustrated. One orifice of transfer passageway 170 communicates with rotor chamber 120 through a compression inlet aperture 176 and with rotor chamber 220 through a power outlet aperture 278. Similary, one orifice of transfer passageway 270 communicates with chamber 220 through a compression inlet aperture 276 and with rotor chamber 120 through a power outlet aperture 178. As will be described in more detail hereinbelow, inlet aperture 176 is positioned such that notch 108 in hub 103 of rotor 100 will be in relative alignment therewith at a predetermined point in the rotation of rotor 100.

Transfer passageway 170 is provided with a spark plug 172 or other conventional fuel-air mixture ignition means and with a conventional fuel injection nozzle 174 for introduction of fuel into passageway 170. As will be described in more detail hereinbelow, the transfer passageways function as combustion chambers wherein compressed air from one rotor chamber is mixed with fuel and ignited and the resulting combusted gases act to rotate the rotor located in the other rotorchamber. Constant pressure by-pass valves 124 and 224 and passageways 125 and 225 connecting the respective by-pass valves to rotor chambers 120 and 220, as shown, are provided to maintain a constant compression ratio when engine 10 is operated at high speeds.

OPERATION

The operation of engine 10 will now be described for one cycle. For the sake of clarity, the cycle will first be described only as it relates to transfer passageway 170, followed by a description of the interrelationship of the various phases that occur in both chambers. Referring to FIGS. 5a through 5i, rotors 100 and 200 rotate in opposite directions and, for this configuration of rotor, 90° out of phase with respect to each other. The first, or intake phase of the cycle is illustrated in FIG. 5a and begins when the leading edge of lobe 107A of rotor 100 is in general alignment with holding chamber 122, as shown, such that outlet aperture 106 is in communication with holding chamber 122 and air from outside engine 10 can pass through intake apertures 140 (not shown) and 102, air passageway 104, and outlet aperture 106 into holding chamber 122 and the area A defined by void 109A. Under operating conditions, rotor 100 may rotate at speeds ranging from 1000 RPM up to 10,000 RPM and higher, and as a consequence, the centrifugal forces acting on the air taken in are significant, creating a "supercharging" effect. Large quantities of air are thereby forced into holding chamber 122 and area A at increased pressure.

As rotor 100 continues to rotate, it reaches the position shown in FIG. 5b, where holding chamber 122 and area A are sealed with respect to each other by the coaction of lobe 107A with the walls 51 of engine block 20, thus trapping a quantity of air in holding chamber 122 and area A at increased pressure due to the supercharging effect referred to hereinabove.

Further rotation of rotor 100 begins the compression phase of the cycle, wherein as shown in FIGS. 5c and 5d, lobe 207A of rotor 200 intermeshes with void 109A of rotor 100. Since at least a portion of the outer surface 107a of lobe 107B of rotor 100 is substantially contiguous with wall 51 of engine block 20 and/or the peripheral surface of hub 203 of rotor 200 during this phase, there is substantially no leakage of gas between these surfaces, particularly when operating at high speed. Similarly, at least a portion of the peripheral surface 207a of lobe 207A of rotor 200 is substantially contiguous with wall 51 of engine block 20 and/or the peripheral surface of hub 103 of rotor 100 during this phase, and there is thus substantially no gas leakage between these surfaces as well. It is to be noted further that during this phase notch 108A in hub 103 of rotor 100 is not in alignment with compression inlet aperture 176 and transfer passageway 170 is thus closed with respect to the air in area A.

As a result of the intermeshing of lobe 207A with void 109A, the air trapped in area A is compressed into a decreasing area B, as shown in FIG. 5d.

At the point of rotation of rotors 100 and 200 where the size of area B has reached a minimum and the gas trapped therein has thus undergone maximum compression, notch 108A in hub 103 of rotor 100 and compression inlet aperture 176 are in relative alignment, allowing the compressed air in area B to escape into transfer passageway 176, as shown in FIG. 5e. Note that at this stage, rotor 200 has rotated to the point where a portion of the upper surface of lobe 207A is in relative alignment with power outlet 276 in the upper wall 54 of engine block 20, thus closing the outlet orifice of transfer passageway 176 and preventing the escape of compressed gas into rotor chamber 220.

As the compressed air enters transfer passageway 176, fuel, preferably in vaporized form, is injected into transfer passageway 176 and the turbulence of the entering gases results in a thoroughly mixed fuel-air mixture.

When rotor 100 has rotated to a point where notch 108 and compression inlet aperture 176 are not in alignment and rotor 200 has almost rotated to a point where lobe 207A no longer blocks power outlet aperture 276, spark plug 172 is fired, igniting the fuel-air mixture in transfer passageway 176 and beginning the power phase of the cycle.

Referring to FIGS. 5f, 5g, and 5h, as rotors 100 and 200 continue their rotations, the expanding combusting gases exit from transfer passageway 170 into rotor chamber 220 as lobe 207A of rotor 200 passes out of alignment with outlet aperture 276. The thrust forces created by the expanding combusting gases act to propel rotor 200 in its rotation. It is to be noted that the generally convex, arcuate shape of the outer surface 107a of lobe 107B of rotor 100 functions to focus the thrust forces from the expanding gases against the relatively opposed inner surface 207b of lobe 207A, and that the generally concave, arcuate shape of inner surface 207b functions to translate the thrust forces into rotational forces which cause rotation or rotor 200.

Since a portion of the outer surface 107a of lobe 107A is substantially contiguous with the peripheral surface of hub 203 and wall 51 of engine block 200 during most of this phase, and since the outer surface 207a of lobe 207B is substantially contiguous with the peripheral surface of hub 103 and/or wall 51 of engine block 20 during that portion of the power phase when the outer surface 107a of lobe 107A is substantially contiguous with only wall 51 and not hub 203, there is substantially no gas leakage between these surfaces. In addition, since compression inlet aperture 176 is not in relative alignment with notch 108A or 108B during this phase, there is substantially no gas leakage from transfer passage 176 into rotor chamber 120.

Depending on the location of exhaust outlet passageway 250, a power phase of up to nearly 90° of the rotation of rotor 200 may be provided.

As shown in FIG. 5i, the power phase of the cycle is completed and the last, or exhaust, phase begun upon rotation of lobe 207A past exhaust outlet passageway 250, whereupon the combusted gases are exhausted from the engine. During the exhuast phase, pressurized air from holding chamber 222 expands into the area defined by void 209B and mixes with the combusted gases as lobe 207A rotates to the point where holding chamber 222 communicates with the area defined by void 209B of rotor 200. This additional air helps to purge void 209B of exhaust gases, while allowing a more complete combustion of the exhaust gases, thus resulting in less pollution.

It is to be noted that as the exhaust begins for rotor 200, rotor 100 has completed one revolution and the intake phase described hereinabove is beginning for the next cycle.

Since all inlets and outlets are opened and closed by the rotors themselves, there are no external valve timing requirements, such as cam shafts, etc. The only timing necessary is for fuel injection and spark plug firing which is accomplished by known techniques. Some leakage is expected, but any leakage due to the elimination of seals normally associated with internal combustion engines is compensated for by relatively high compression ratios, on the order of 12 to 15 to 1. As mentioned hereinabove, a predetermined compression ratio may be maintained for varying speeds of rotor rotation by means of constant pressure by-pass valves 176 and 276.

Figure 6A:
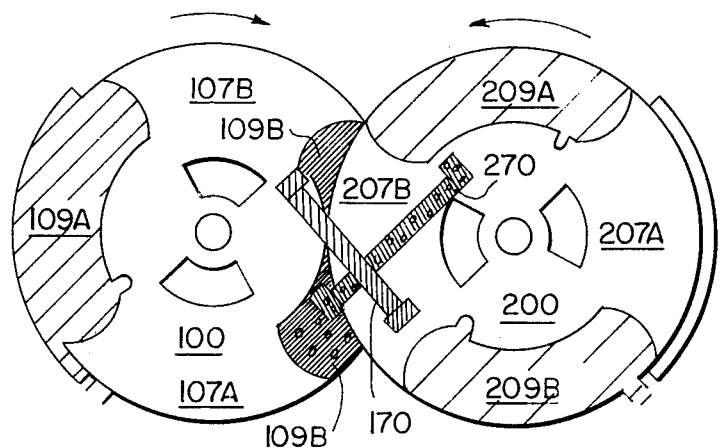
FIGS. 6a through 6c are schematic diagrams showing successive phases of a complete cycle of the engine shown in FIG. 1 for both transfer passageways.
Figure 6B:
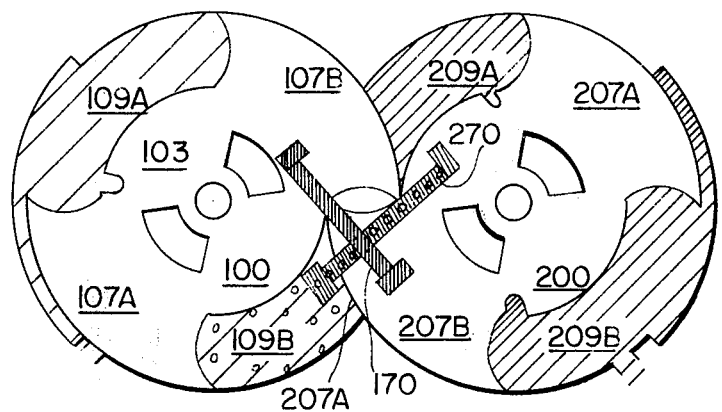
Figure 6C:
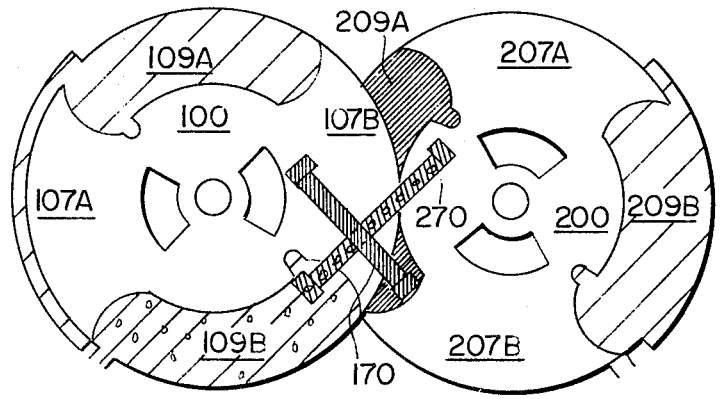

Referring now to FIGS. 6a through 6c, the interrelationship of the various phases that occur in each rotor chamber of engine 10 at the same time during a cycle will be described.

In FIG. 6a, rotors 100 and 200 are in positions corresponding to those shown in FIG. 5e. Thus the current cycle's compression phase described hereinabove, involving the trailing portion of void 109B, has been completed for transfer passageway 170 and the fuel-air mixture in transfer passageway 170 is ready for ignition. At the same time, the next cycle's intake phase, involving void 109A, and the previous cycle's exhaust phase, involving void 209B, for transfer passageway 170 have begun. In addition, the preceeding cycle's power phase for transfer passageway 270, involving the leading portion of void 109B, has begun and the current cycle's compression phase for transfer passageway 270, involving void 209A, is about to begin.

In FIG. 6b, rotors 100 and 200 have rotated to the point where no portion of the outer surface 207a of lobe 207B is in substantial contact with the peripheral surface of hub 103. The various portions of the engine have begun those cycles which were about to begin in FIG. 6a, or are still in the same phases which had already begun in FIG. 6a.

In FIG. 6c, rotors 100 ad 200 have rotated to positions corresponding to those shown in FIG. 5f. Thus, the current cycle's power phase for transfer passageway 170, involving the leading portion of void 209A, has begun. The current cycle's power phase for transfer passageway 270, involving void 109B, is completed and the exhuast phase therefor is about to begin. The preceding cycle's exhaust phase for transfer passageway 170 has ended and the next cycle's intake phase for transfer passageway 270 is about to begin. At the same time, the current cycle's compression phase for transfer passageway 270 is almost completed, and the previous cycle's exhaust phase is completed. The next cycle's intake phase for transfer passageway 170 is almost completed.

Thus, for each rotor, there are two power phases, etc. for each revolution of a rotor.

It will be appreciated by those skilled in the art that, although the invention has been described relative to exemplary embodiments thereof, modifications and variations can be effected in these embodiments without departing from the scope and spirit of the invention.

We claim:

1. A rotary combustion engine comprising
an engine block,
said engine block having therein at least first and second adjoining rotor chambers and first and second peripheral holding chambers communicating with said first and second rotor chambers, respectively, and air intake means communicating with said first and second rotor chambers,
at least first and second rotors disposed in said first and second rotor chambers, respectively,
said rotors having at least two spaced lobes defining voids therebetween, said rotor chambers being configured such that each of the lobes of said rotors meshes with a corresponding void of the other rotor,
each of said lobes having an air intake passageway therethrough, the air intake passageways of said first rotor communicating with said first holding chamber when at least a portion of said air intake passageways is in relative alignment with at least a portion of said first holding chamber, and the air intake passageways of said second rotor communicating with said second holding chamber when at least a portion of said air intake passageways is in relative alignment with at least a portion of said second holding chamber,
said air intake passageways constituting means for providing a supercharging effect when said rotors are rotated.

2. The rotary combustion engine of claim 1 wherein the air intake passageways in the rotor lobes are provided with at least one vane extending radially with respect to the axis of rotation of said rotors to increase said turbocharging effect.

3. The rotary combustion engine of claim 1 wherein said rotors comprise a central hub from which said lobes extend radially outward, said lobes being generally crescent shaped.

4. The rotary engine of claim 1 including means defining at least first and second transfer passageways which function as combustion chambers, said transfer passageways each being provided with means for supplying fuel thereto, and ignition means for effectuating combustion of fuel therein, said first transfer passageway connecting said first rotor chamber with said second rotor chamber such that air compressed by the intermeshing of the voids of said first rotor and the lobes of said second rotor may be mixed with fuel and ignited therein to provide a thrust for rotating said second rotor, and said second transfer passageway connecting said second rotor chamber with said first rotor chamber such that air compressed by the intermeshing of the voids of said second rotor and the lobes of said first rotor may be mixed with fuel and ignited therein to provide a thrust for rotating said first rotor.

5. The rotary engine of claim 4 including means for admitting air compressed by said intermeshing of the voids and lobes of said rotors into said transfer passageways in timed relationship to the rotation of said rotors.

6. The rotary engine of claim 5 wherein said rotors comprise a central hub from which said rotors extend radially outward and said means for admitting air into said transfer passageways comprises at least first and second notches located in the periphery of said hub to provide communication between a void and the corresponding transfer passageway when said transfer passageway and notch are in relative alignment.

7. The rotary engine of claim 1 including at least first and second exhaust means communicating with said first and second rotor chambers, respectively, and communicating with said first and second holding chambers, respectively, for predetermined intervals responsive to rotation of said rotors, such that combusted gases formed during operation of said engine may be purged from said rotor chambers by air from said holding chambers.

* * * * *